United States Patent [19]

Kim

[11] Patent Number: 5,359,459
[45] Date of Patent: Oct. 25, 1994

[54] OPTICAL SYSTEM DRIVING APPARATUS

[75] Inventor: Chun-dong Kim, Suwon, Rep. of Korea

[73] Assignee: SamSung Electronics Co., Ltd., Suwon, Rep. of Korea

[21] Appl. No.: 851,678

[22] Filed: Mar. 11, 1992

[30] Foreign Application Priority Data

May 13, 1991 [KR] Rep. of Korea .................. 91-7718

[51] Int. Cl.⁵ .......................... G02B 7/02; G11B 21/10
[52] U.S. Cl. .................................. 359/824; 359/814;
369/44.14; 369/44.15
[58] Field of Search .................. 359/813–814,
359/823–824; 369/44.11–44.19, 44.21–44.26

[56] References Cited

U.S. PATENT DOCUMENTS

| | | | |
|---|---|---|---|
| 4,386,823 | 6/1983 | Musha | 359/813 |
| 4,507,764 | 3/1985 | Musha | 359/814 |
| 4,566,089 | 1/1986 | Kime | 359/824 |
| 4,664,476 | 5/1987 | Kasuga | 359/824 |
| 4,720,185 | 1/1988 | Kurihara | 359/824 |
| 4,750,164 | 6/1988 | Nose | 359/814 |
| 4,759,005 | 7/1988 | Kasahara | 359/814 |
| 4,818,066 | 4/1989 | Nose | 359/813 |
| 4,861,138 | 8/1989 | Suzuki | 359/814 |
| 4,878,214 | 10/1989 | Hinotani | 369/44.14 |
| 5,018,836 | 5/1991 | Noda et al. | 359/824 |
| 5,046,821 | 9/1991 | Seino | 359/823 |
| 5,056,891 | 10/1991 | Masunaga | 359/813 |
| 5,105,405 | 4/1992 | Hashimoto et al. | 359/814 |
| 5,107,372 | 4/1992 | Gelbart et al. | 359/824 |
| 5,128,806 | 7/1992 | Ohno | 359/813 |
| 5,165,088 | 11/1992 | Suzuki et al. | 359/813 |
| 5,177,640 | 1/1993 | Grassens | 359/824 |

FOREIGN PATENT DOCUMENTS

| | | | |
|---|---|---|---|
| 62-31038 | 2/1987 | Japan. | |
| 38537 | 2/1987 | Japan | 369/44.15 |
| 62-149044 | 7/1987 | Japan. | |
| 63-167436 | 7/1988 | Japan. | |
| 0117226 | 1/1989 | Japan. | |

Primary Examiner—Loha Ben
Assistant Examiner—Thong Nguyen
Attorney, Agent, or Firm—Robert E. Bushnell

[57] ABSTRACT

An optical system driving apparatus is capable of vertically and horizontally driving an optical lens, a part of the lens or a complete optical system including the optical lens. The apparatus is miniaturized and lightened in order to have a rapid response characteristic and a wide control limit, by the utilization of a single magnetic circuit forming a ferromagnetic field between two magnets, and an electronic circuit having a plurality of coil elements having a force acting in each direction in a ferromagnetic field. The optical system is placed in the magnetic field between the two magnets and interlinked to the coil elements, thereby occupying minimal space.

7 Claims, 2 Drawing Sheets

OPTICAL SYSTEM DRIVING APPARATUS

BACKGROUND OF THE INVENTION

The present invention relates to an optical driving apparatus for driving either the whole optical pickup or the objective lens of the optical pickup vertically or horizontally, for use in an optical apparatus such as an optical pickup of an optical disk player or the like, and more particularly to an optical system driving apparatus having a wide control limit.

The optical pickup of an optical disc player comprises semiconductor laser emitting a laser light, an objective lens focusing the laser light onto the optical disc, and a photodetector detecting the light reflected from the optical disc as an electronic playback signal and a control signal respectively. Such an optical disc player records information onto the optical disc, and reads the recorded information from the optical disc. Generally, this is set up to undergo coarse-seeking in the radial direction of the optical disc by an actuator such as a voice coil motor in order to access the objective lens to the target track of the optical disc. Also, the objective lens in the optical pickup is set up to undergo fine-seeking in the vertical or horizontal direction by another actuator in order to project the light spot focused on the optical disc onto the exact center of the target track. Here, a fine-seek actuator is set up to move together with the optical pickup by means of a coarse-seek actuator (refer to U.S. Pat. Nos. 4,761,773 and 4,837,757).

In such an optical pickup, the fine-seeking actuator acts as the load of the coarse-seeking actuator, so it is desirable that the fine-seek actuator is small and light for the rapid response characteristic of the coarse-seek actuator. It is also desirable that the moving range of the fine-seek actuator is wide for a high-speed seek.

An objective lens driving apparatus of an optical disc player is disclosed in U.S Pat. No. 4,646,283. The apparatus comprises a coil having an objective lens holder connected to a base via four linear members, a coil mounted on the objective lens holder, a magnet generating magnetic flux, and a yoke constituting the magnetic path of the magnetic flux.

FIGS. 1A and 1B are schematic diagrams showing the structure of the above apparatus. That is, the right and left faces of an objective lens holder 1 are formed recessed, and edges 4a and 5a of yokes 4 and 5 to which magnets 2 and 3 are mounted, respectively, is placed in the recessed portion. A coil not shown in the drawings is wound around or mounted on objective lens holder 1 to interlink with a magnetic flux field (represented by an array of arrows) distributed between magnets 2 and 3; specifically, between edges 4a and 5a of yokes 4 and 5. In the prior art, one portion of a yoke is stretched to the inside of an objective lens holder, so that the objective lens holder occupies a lot of space and its range of fine-seeking in the horizontal direction is narrow. Therefore, the conventional apparatus has disadvantages in that the power loss of a coarse-seek actuator which coarse-seeks a fine-seeking actuator is large, and has an insufficient response characteristic due to the heavy load of an optical pickup including the fine-seek actuator. Moreover, the time required for coarse-seeking becomes overly long because the range of fine-seeking of the objective lens is narrow, which makes the apparatus unfavorable for a high-speed seeking.

SUMMARY OF THE INVENTION

The object of the present invention is to provide an optical driving apparatus for driving an optical system such as the objective lens of an optical pickup or the like, which has less power loss, a rapid response characteristic, and a wide control limit that is favorable to high-speed seeking.

To achieve the object, the optical driving apparatus of the present invention for vertically and horizontally driving an optical system supported on a base via an elastic linear member, comprises two magnets generating magnetic flux vertical to the right and left faces of the optical system, respectively, and arranged so that opposing magnetic poles face each other, a yoke member connecting the magnetic poles of the magnets not facing each other and forming the single magnetic path of the magnetic flux, and a plurality of coils wound around or mounted on the lens holder in order to be interlinked with the magnetic flux and arranged to generate forces in the vertical or horizontal direction, respectively.

BRIEF DESCRIPTION OF THE DRAWINGS

The above and other objects, features and advantages of the present invention will become apparent from the following description taken in conjunction with the accompanying drawings, throughout which like references designate like elements.

DETAILED DESCRIPTION OF THE INVENTION

Figure 1A:
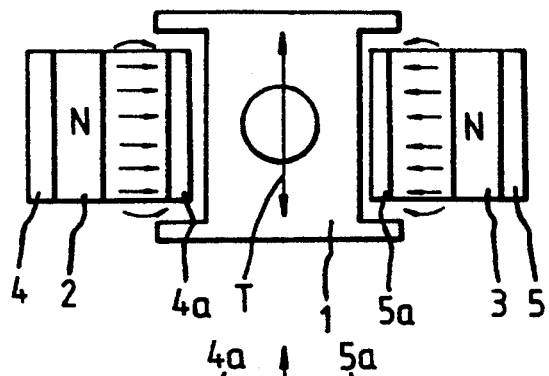
FIG. 1A is a schematic plan view of a conventional optical system driving apparatus.
Figure 1B:
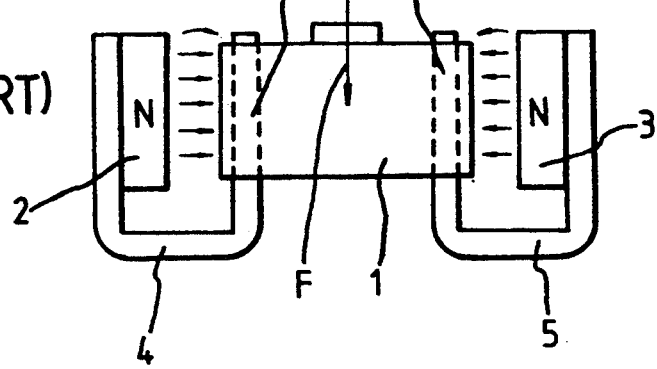
FIG. 1B is a schematic side view of the conventional optical system driving apparatus of FIG. 1A.
Figure 2A:
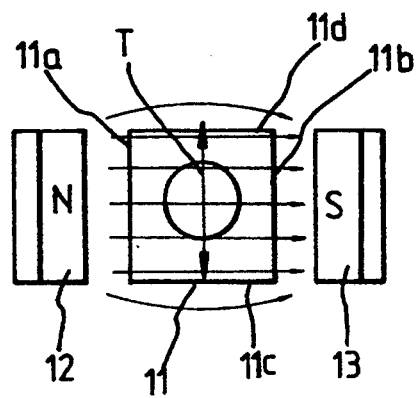
FIG. 2A is a schematic plan view of an optical system driving apparatus constructed according to the present invention.
Figure 2B:
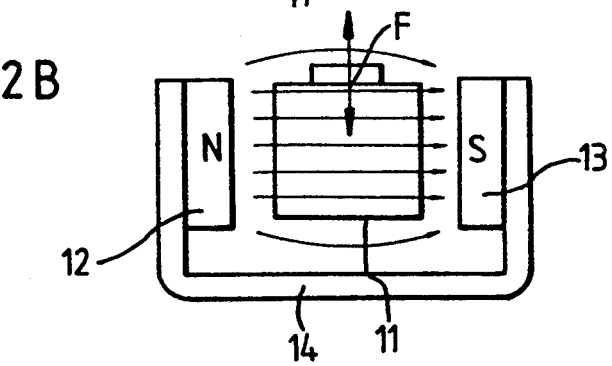
FIG. 2B is a schematic side view of the optical system driving apparatus shown in FIG. 2A.

FIGS. 2A and 2B are schematic diagrams of an optical driving apparatus according to the present invention illustrated correspondingly to FIGS. 1A and 1B, respectively. That is, an optical system 11 is arranged between magnets 12 and 13, and occupies a minimum space. The two magnets 12 and 13 having different polarities (N-pole and S-pole) oppose each other to generate a strong magnetic flux, and with a yoke member 14, thereby form a single magnetic circuit. The direction of the magnetic flux is represented with fine lines. The magnetic flux flowing from magnet 12 toward magnet 13 is distributed around the optical system 11 arranged between two magnets 12 and 13. Therefore, it is possible for optical system 11 to move in both focusing direction F and tracking direction T by winding or mounting coils interlinked to the magnetic flux and then providing forces in two perpendicular directions on right and left faces 11a and 11b and front and rear faces 11c and 11d of optical system 11. Here, the motion of optical system 11 is not impeded by the element of the magnetic circuit, which allows for a wider range of movement than in the prior art.

Figure 3:
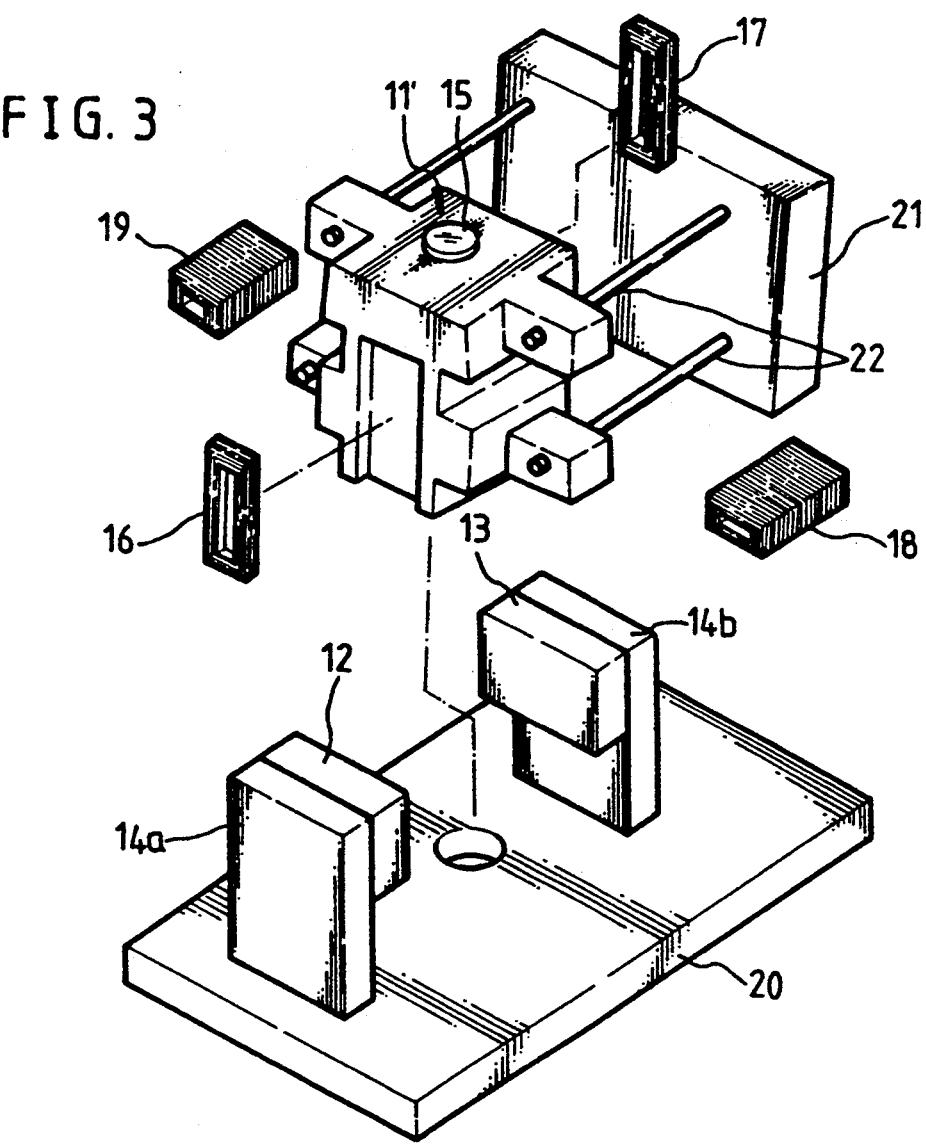
FIG. 3 is an exploded view showing an embodiment of the optical system driving apparatus constructed according to the present invention.
Figure 4:
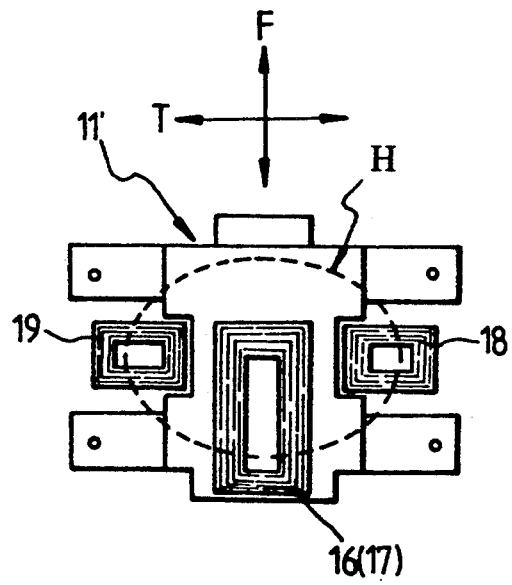
FIG. 4 is a front view for explaining the active electromagnetic forces according to the coil arrangement of the embodiment in FIG. 3.

FIG. 3 and FIG. 4 illustrate embodiments of the optical system driving apparatus according to the present invention which are applied to the optical pickup of an optical disc player. In these drawings, a reference numeral 11' designates the objective lens holder of an optical pickup such as the aforementioned optical system 11. An objective lens 15 focusing a light beam is mounted in objective lens holder 11' on which the whole optical system including objective lens 15 or any part of the lens 15 is mounted according to the type of the optical pickup. Objective lens holder 11' has recessed grooves (their reference designations are omitted) for mounting respective coils on its right, left, front and rear faces, thereby mounting coils 16 and 17 for driving in the focusing direction and coils 18 and 19 for driving in the tracking direction. These coils 16, 17, 18 and 19 are mounted to be vertically interlinked to the magnetic flux distributed between permanent magnets 12 and 13. Thus, when current flow through these coils 16, 17, 18 and 19, the forces in focusing direction F and tracking direction T act according to the directions of the currents. A detailed explanation of this will be described below in reference with FIG. 4.

Magnets 12 and 13 are secured to yokes 14a and 14b mounted on base 20 and form a single magnetic circuit.

In FIG.4, the dotted line shows the range of a magnetic field H of the aforementioned magnetic flux having a direction entering the drawing perpendicularly. Only the upper, right and left portions of coils 16 and 17 for driving in the focusing direction are placed in magnetic field H. When a predetermined current is supplied to these portions, the force in focusing direction F acts on the upper portion of coils 16 and 17, while forces in tracking direction T act on their right and left sides. However, because the current direction in the right side is opposite to that of the left side, the forces in track direction T cancel each other, leaving only the force in focusing direction F.

Meanwhile, as for driving in the tracking direction, only the inner, upper and lower portion of coils 18 and 19 are within magnetic field H, so that their inner portions activate the force in tracking direction T, while their upper and lower sides activate the force in focusing direction F. However, as described above, the active forces of the upper and lower sides are offset, so that only the force T in the tracking direction remains active.

Therefore, by use of coils 16, 17, 18 and 19, objective lens holder 11' can minutely move in both focusing direction F and tracking direction T.

Reference numeral 21 designates a support fixed on base 20, and 22 designates an elastic linear member connecting objective lens holder 11' and support 21.

As above, in the embodiment of the present invention, a single magnetic circuit is constructed by magnets 12 and 13 and yoke members 14 (14a and 14b), so that the optical system driving apparatus can be minimized and lightened. According to the present invention, the load of the coarse-seeking actuator for coarse-seeking an optical pickup (or an optical system) together with the apparatus of the present invention is reduced, so that the power loss of the coarse-seeking actuator is also reduced, and the response characteristic is improved. Also, the present invention in an optical disc player controls a focus/track servo by a wider width, and reduces the access time of the optical pickup for a target track of the optical disc, thereby being further favorable to high-speed seeking.

Although preferred embodiments of the invention, have been described in detail above with reference to the drawings, it will be apparent that the invention is not limited to these precise embodiments, and that many modifications and variations could be effected by one skilled in the art without departing from the spirit or scope of the invention as defined in the appended claims.

What is claimed is:

1. An optical system driving apparatus for displacing an optical system along a tracking axis and a focusing axis orthogonal to said tracking axis, said optical system comprising:

an objective lens defining an optical axis extending parallel to said focusing axis[, said driving apparatus comprising:

a base;

an objective lens holder for carrying said objective lens; a first magnet and a second magnet each disposed at different longitudinal ends of said objective lens holder, such that said first magnet and said second magnet do not contact said objective lens holder;

means for elastically supporting said objective lens holder on said base between said first magnet and said second magnet;

means for supporting said first magnet and said second magnet on said base;

a first focusing coil and a second focusing coil mounted on said objective lens holder at said different longitudinal ends of said objective lens holder, said first focusing coil and said second focusing coil for displacing said optical system along said focusing axis to focus light transmitted through said objective lens, said first focusing coil and said second focusing coil being wound around a first core axis, said first core axis being perpendicular to said optical axis; and a first tracking coil and a second tracking coil mounted on said objective lens holder on different lateral sides of said objective lens holder and located substantially equidistantly between said first magnet and said second magnet, said first tracking coil and said second tracking coil for displacing said optical system along said tracking axis to provide for tracking of said light transmitted through said objective lens onto said an information storage medium, said first tracking coil being wound around a second core axis, said second tracking coil being wound around a third core axis, said second core axis and said third core axis being parallel to said first core axis.

2. An apparatus as claimed in claim 1, wherein said magnet supporting means comprises:

a first member erected on said base for supporting said first magnet; and a second yoke member erected on said base for supporting said second magnet.

3. An optical system as claimed in claim 1, wherein said first tracking coil and said second tracking coil are located substantially at longitudinal centers of said lateral sides of said objective lens holder.

4. An optical system driving apparatus for displacing an optical system along a tracking axis and a focusing axis orthogonal to said tracking axis, said optical system comprising:

an objective lens defining an optical axis extending parallel to said focusing axis a base;

an objective lens holder for carrying said objective lens, said holder having a pair of spaced-apart lateral sides;

a first magnet and a second magnet each disposed at different longitudinal ends of said objective lens holder, with said first magnet and said second magnet spaced-apart from said objective lens holder;

means for elastically supporting said objective lens holder on said base between said first magnet and said second magnet;

a first yoke member erected on said base for supporting said first magnet;

a second yoke member erected on said base for supporting said second magnet;

a first focusing coil and a second focusing coil mounted on said objective lens holder at said different longitudinal ends of said objective lens holder, said first focusing coil and said second focusing coil for displacing said optical system along said focusing axis to focus light transmitted through said objective lens, said first focusing coil and said second focusing coil being wound around a first core axis, said first core axis being perpendicular to said optical axis; and a first tracking coil and a second tracking coil located along longitudinal centers of difference corresponding ones of said lateral sides of said objective lens holder, said first tracking coil and said second tracking coil mounted on said objective lens holder on different corresponding lateral sides of said objective lens holder and located substantially equidistantly between said first magnet and said second magnet, said first tracking coil and said second tracking coil for displacing said optical system along said tracking axis to provide for tracking of said light transmitted through said objective lens onto an information storage medium, said first tracking coil being wound around a second core axis, said second tracking coil being wound around a third core axis, said second core axis and said third core axis being parallel to said first core axis.

5. An optical system as claimed in claim 4, wherein said elastically supporting means comprises:

a first pair of elastic members extending parallel to said base and engaging a first pair of protuberances erected on a first one of said lateral sides of said objective lens holder; and a second pair of elastic members extending parallel to said base and engaging a second pair of protuberances erected on a second one of said lateral sides of said objective lens holder;

said first tracking coil being located between said first pair of protuberances and said second tracking coil being located between said second pair of protuberances.

6. An optical system as claimed in claim 5 wherein said first pair of elastic members and said second pair of elastic members extend parallel to said first core axis.

7. An optical system as claimed in claim 4, further comprised of said elastically supporting means comprising:

a first pair of elastic members extending parallel to said base and engaging a first one of said lateral sides of said objective lens holder;

a second pair of elastic members extending parallel to said base and engaging a second one of said lateral sides of said objective lens holder; and said first tracking coil being located said first one of lateral sides and said second tracking coil being located along said second one of lateral sides.

* * * * *